United States Patent
Diekhans et al.

(10) Patent No.: US 6,389,785 B1
(45) Date of Patent: May 21, 2002

(54) CONTOUR SCANNING APPARATUS FOR AGRICULTURAL MACHINERY

(75) Inventors: Norbert Diekhans; Jochen Huster, both of Gütersloh (DE)

(73) Assignee: Claas Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 09/543,323

(22) Filed: Apr. 5, 2000

Related U.S. Application Data

(63) Continuation-in-part of application No. 09/103,431, filed on Jun. 24, 1998, now abandoned.

(30) Foreign Application Priority Data

Jun. 24, 1997 (DE) .......................... 197 26 917

(51) Int. Cl.⁷ ............................................. G06F 165/00
(52) U.S. Cl. ................... 56/10.2 F; 172/4.5; 364/460
(58) Field of Search ................... 56/10.2 F, 10.2 R, 56/10.2 A, 119, DIG. 7, DIG. 10; 403/78, 79, 164, 150; 294/82.1, 81.1

(56) References Cited

U.S. PATENT DOCUMENTS

| | | | |
|---|---|---|---|
| 4,077,488 A | * | 3/1978 | Bennett, Jr. et al. .......... 180/98 |
| 4,706,773 A | * | 11/1987 | Reinaud ...................... 180/169 |
| 4,868,752 A | * | 9/1989 | Fujii et al. ............. 364/424.02 |
| 5,019,983 A | | 5/1991 | Schutten et al. |
| 5,509,486 A | | 4/1996 | Anderson |

(List continued on next page.)

FOREIGN PATENT DOCUMENTS

| | | |
|---|---|---|
| DE | 24 55 836 C3 | 8/1976 |
| DE | 93 12 542 U1 | 10/1993 |
| DE | 43 42 171 C2 | 5/1994 |
| DE | 43 18 798 A1 | 6/1994 |
| DE | 195 44 112 A1 | 5/1997 |

OTHER PUBLICATIONS

Hoffman, Lutz, Swath Scanning with Ultrasound, Landtechnik 5–93, pp. 266–268, No Translation.

US Application No. 09/442,443 Filed Nov. 17, 1999 "Method of Adjusting a Sensor Unit Mounted on a Field Machine and an Adjusting Device Therefor"; Attorney Docket No. 3899/59156–070.

US Application No. 09/412,668 Filed Oct. 5, 1999 "Automatic Steering System Using an Ultrasonic Position–finding Device"; Attorney Docket No. 3898/59156–066, PN 6244024.

(List continued on next page.)

*Primary Examiner*—Robert E. Pezzuto
*Assistant Examiner*—Árpád Fábián Kovács
(74) *Attorney, Agent, or Firm*—Husch & Eppenberger, LLC; Robert E. Muir

(57) ABSTRACT

A device on a mobile agricultural machine for contactless scanning of contours extending over the ground, such as the contour of a swath of crop material. In this case there is used a laser distance measuring device consisting of a laser beam transmitting and receiving device which determines the distance from a contour point by measuring the running time of a laser scanning beam emitted and reflected at the contour point. The laser scanning beams are pivoted within a certain angular range stepwise or continuously in a scanning beam plane. In this case the laser distance measuring device is mounted with an orientation on the agricultural machinery such that the scanning beam plane is inclined to the ground at an acute angle forwards in the direction of travel. With the aid of an analyzer, the position of the contour point corresponding to each pivot angle, based upon the measured distance and the arrangement and orientation of the laser distance measuring device on the agricultural machine, can be determined.

39 Claims, 10 Drawing Sheets

U.S. PATENT DOCUMENTS

| | | | | |
|---|---|---|---|---|
| 5,612,864 A | * | 3/1997 | Henderson | 364/167.01 |
| 5,666,792 A | * | 9/1997 | Mullins | 56/10.2 A |
| 5,666,793 A | | 9/1997 | Bottinger | |
| 5,715,665 A | | 2/1998 | Diekhans et al. | |
| 5,715,666 A | | 2/1998 | Huster et al. | |
| 5,905,968 A | | 5/1999 | Staub et al. | |
| 5,911,669 A | | 6/1999 | Stentz et al. | |
| 5,928,309 A | | 7/1999 | Korver et al. | |
| 5,935,183 A | | 8/1999 | Sahm et al. | |
| 5,937,621 A | | 8/1999 | Eggenhaus | |
| 6,095,254 A | * | 8/2000 | Homburg | 172/6 |
| 6,101,795 A | * | 8/2000 | Diekhans | 56/10.2 F |

OTHER PUBLICATIONS

US Application No. 09/163,843 Filed Sep. 30, 1998 "Device and Method for detecting Cultivation Boundaries and Other Guide Variables"; Attorney Docket No. 3813/59156–036 PN 6095254.

US Application No. 09/076,160, Filed May 12, 1998 "Automatic Steering Mechanism and Method for Harvesting Machine"; Attorney Docket No. 3824/59156–018, PN 6101795.

* cited by examiner

CONTOUR SCANNING APPARATUS FOR AGRICULTURAL MACHINERY

APPLICATION CROSS-REFERENCE

This application is a continuation-in-part of abandoned application Ser. No. 09/103,431 filed Jun. 24, 1998.

BACKGROUND OF THE INVENTION

The invention relates generally to agricultural machinery and, more particularly, to improvements to agricultural machinery for harvesting crops having an apparatus for contactless scanning of contours extending over the ground.

An apparatus generally of this kind is known from the article "Swath Scanning with Ultrasound" (periodical: Landtechnik 5–93, pages 266–268). The apparatus described there consists of a plurality of ultrasound sensors which are arranged on a fastening strip at a distance of 40 cm from each other and are directed vertically onto the ground. This fastening strip may, for example, be mounted on agricultural equipment such as a forager or an agricultural machine towing a baling press. By means of the ultrasound sensors the height a swath, for example of straw or green fodder, above the ground can be determined at certain points, allowing the contour of the swath over the ground to be scanned along a horizontal line. The device described therein, however, has at least a few significant drawbacks. That scanning device is relatively expensive because several ultrasound sensors are necessary for scanning. Furthermore there is insufficient distance between the ultrasound sensors and, as a result, the ultrasound sensors have a disturbing effect on each other due to inadequate focusing of the sound lobes. This limits the horizontal resolution or density of measuring points of contour scanning.

Furthermore the distance of the ultrasound sensors from ground or the contour to be scanned must not become too great (not more than about 1.2 m.), because the resultant relatively high divergence of the sound lobes to the ultrasound sensors have a disturbing effect on each other. A sufficiently low height of mounting on the agricultural machinery is often difficult to achieve simply for structural reasons. Moreover such a bulky and low-set fastening strip with several ultrasound sensors is very easily damaged when used in the field. Increasing the height at which the fastening strip is set, however, is possible only if the distance between the ultrasound sensors on the fastening strip is also increased, which in turn means a lower horizontal resolution of swath contour scanning.

The attempt to reduce the minimum distance between the ultrasound sensors by implementing adjacent sensors that measure alternately, rather than simultaneously, requires an elaborate control circuit for the individual ultrasound sensors.

For forward-looking contour scanning such as would be necessary for example for automatic steering along the scanned swath contour, the fastening strip with the ultrasound sensors would have to be mounted in an elaborate and tedious manner on an additional holding linkage arranged at the front of the agricultural machinery and extended forwardly.

Another drawback of the known scanning apparatus lies in that the accuracy and reliability of scanning crop material by means of ultrasound greatly depends on the nature and properties of the crop material and on weather conditions.

Eggenhaus (U.S. Pat. No. 5,937,621) discloses an automatic system to control the cutting height and the reel height by an adjusting device which adjust the height of both by stored values. This system is needed if there is a change between standing and laying crop. Both, the cutting height and the reel height should be changed then. But if only the standing crop height changes, only the reel height must be changed without a change in the cutting height. This could be done by a manual adjustment from the operator. The absolute height of the stubble or the standing crop is not measured.

It is an object of the present invention to provide an apparatus on agricultural machinery for contactless scanning of contours extending over the ground, which eliminates the drawbacks of the devices described above. A further object of this invention is to provide a way to calculate the cross-sectional area.

A further object of this invention is to calculate an inclination offset.

A further object of this invention is to use the inclination offset when calculating contour information.

SUMMARY OF THE INVENTION

In accordance with the present invention, there is provided an agricultural machine having an apparatus for contactless scanning of contours extending over the ground comprising a laser distance measuring device, which has a laser beam transmitting and receiving device that determines the distance from a contour point by measuring the running time of the laser scanning beam emitted and reflected at the contour point. The laser scanning beams are pivotal within a certain angular range stepwise or steplessly in a scanning beam plane. In one embodiment the laser distance measuring device is mounted on the agricultural machine such that the scanning beam plane is inclined to the ground at an acute angle forwards in the direction of travel. With the aid of an analyzer, for each pivot angle from the measured distance, the arrangement and orientation of the laser distance measuring device on the agricultural machine (mounting height, angle of inclination to ground) is determined, as well as the position of the contour point corresponding to the pivot angle (vertical and horizontal position above the ground).

In accordance with another feature of the present invention there is provided a method of contour scanning during travel of an agricultural machine including the steps of providing a laser beam transmitting and receiving device; continually scanning the laser beam across the contour of the field in front of the machine; measuring the distance values from the laser beam; determine the contour of the field across the scanning width; and storing the contour information.

The use and arrangement of a laser distance measuring device embodying the invention has considerable advantages over the prior art scanning device described above.

Only one laser beam transmitting and receiving device is needed for the scanning device embodying the invention. Thus, this scanning device is considerably less expensive than the known ultrasound scanning device which requires several ultrasound sensors. The apparatus embodying the invention scans a contour in front of the agricultural machine at various points transverse to the direction of travel by pivoting the laser scanning beam. Thus the number of scanning points on a scanning line is substantially greater than with the ultrasound scanning device. Thus for example with a pivot angle range of ±45° and pivoting of the laser scanning beam in 0.5° steps, the result is 180 scanning points. Due to the low divergence of the laser scanning beam a relatively high resolution (density of scanning points) can be obtained, as the centers of adjacent scanning points lie close to each other without the scanning spots overlapping on the contour. Furthermore, unambiguous assignment of the point of reflection is possible.

Adjacent sensors do not adversely affect each other as with the prior-art scanning device, because the distances from the contour points are determined successively.

Scanning a significant distance ahead, such as is necessary for automatic steering along a scanned contour, can be achieved in a simple manner with the device embodying the invention. Thus, for example with a mounting height 380 cm. above the ground on an agricultural machine and an angle of inclination to the ground of 65°, a scanning distance in front of the agricultural machinery of approximately 8.15 m can be obtained. Due to the low divergence of the laser scanning beam, the scanning distance is not limited as in the case of ultrasound sensors. Contour scanning which may be achieved at relatively great distances cannot be achieved with the prior-art ultrasound scanning device. This would require a correspondingly long holding linkage in front of the agricultural machinery for receiving the fixing strip for the ultrasound sensors, which would cause the whole system to become completely impracticable.

Reflection of the laser scanning beam, unlike ultrasound, is relatively independent of any weather-related properties of the crop material to be scanned. Therefore, the possibilities of use of equipment utilizing the laser scanning device are increased with the present invention.

In a preferred embodiment the laser scanning beam is pivoted by means of a rotatable mirror or by means of a movable focusing device. Hence a relatively high number of scanning pivot paths per second and a high scanning frequency can be obtained, which is important particularly at higher traveling speeds. For example when using galvanometer motors for rotation of the rotary mirror, pivoting in a range of one millisecond is possible and, accordingly, a high scanning point density in the direction of travel of the agricultural machine can be obtained.

In an alternative embodiment for pivoting the laser scanning beam it is provided that the laser distance measuring device itself can be pivoted to pivot the laser scanning beam.

In one embodiment the laser distance measuring device is mounted within the driver's cab, behind the windshield. Dust on the windshield can be filtered out of the signals and, thus, does not impair the reliability of scanning. Furthermore, the windshield itself also does not impair efficiency.

The scanning device embodying the invention can be used for the most varied applications owing to its high accuracy and reliability and its simple design and handling.

Thus, it is provided that, during travel of the agricultural machine continuously along the path covered, the contour across the scanning width is determined and stored. By this method the contour of swaths of crop material to be picked can be scanned and recorded very accurately. With the aid of the scanned contour, an analyzer determines the cross-section of the scanned swath of crop material over the ground base line in each case. This swath cross-section determination is used to adjust the traveling speed of the agricultural machine, wherein regulation can be adjusted for example to constant or maximum pick-up of crop material. With a decreasing swath cross-section the traveling speed is increased, so that the crop material picked up per unit of time is constant. If crop material-specific density data are available, these can also be linked to the measured swath cross-section. This information, in conjunction with a measured swath distance traversed and volume calculation, makes it possible to determine, on line, the crop material picked up during travel. Furthermore the swath-specific quantities determined in this way are in each case also used to adjust optimum working parameters of the harvesting machine.

In an advantageous embodiment of the invention, the right-of-way distance of the agricultural machinery determined within the pivot time of the scanning beam can be included in distance measurement as well.

In a particularly advantageous manner, the scanned swath contour, preferably the swath center, is used during swath pick-up for automatic steering of the agricultural machinery.

In conjunction with a real-time position finding system arranged on the agricultural machinery, such as a satellite navigation system or a global positional system (GPS), it is possible, over the whole area of use or over partial areas, to assign the scanned contours in each case to terrestrial coordinates (geographical length and width, if occasion arises height above NN—or Cartesian coordinates (x, y) referred to a point on the field). In this case, in addition to the swath-specific quantities, the distances between adjacent swaths are also determined and from them are generated surface area data or yield data. These are then stored for further use.

Using a sensor on the agricultural machinery which determines the inclined positions of the agricultural machinery for example when used on a slope, or when traveling in hollows or over ground undulations, in conjunction with a GPS position finding system arranged on the agricultural machinery, by scanning the ground contour, taking into account the inclined positions of the agricultural machinery and position, a high-precision, three-dimensional terrain model of the agriculturally useful area can be produced. The inclined positions of the harvesting machine can also be used for easy correction of the scanning distance.

Another use of the laser scanning device is to determine the distance of a corn ear surface from the harvesting machine. This signal is used to regulate the height of the cutter bar or reel, and relieves that responsibility from the operator. In this application the scanning distances measured can further be used to determine the actual load on the cutting mechanism. For this, the boundaries of the cutting mechanism are each assigned to a pivot angle of the laser scanning device. If a sudden change of contour takes place in this pivot range, there is a material edge at this point. Between this measured material edge and the boundary of the cutting mechanism furthest away, the load can then be determined. Should there be several sudden changes in the edge of the material due to lodging points in the standing crop, the sudden changes in material edge on the outside at any given time or one sudden change in material edge on the outside and one of the predefined boundaries of the cutting mechanism are used to determine the load on the cutting mechanism. This load value can then be recorded and/or used for more accurate surface area calculation.

Another use consists of scanning driving lanes which exist due to preceding working applications (e.g. sowing and application of crop protection agents) in a standing crop, wherein automatic steering of the harvesting machine is carried out by known means with the aid of these scanned driving lanes.

Another advantageous use of the laser scanning device is the scanning of cultivation tracks. Such scanning during cultivation provides a means by which a agricultural machine can be steered automatically along a scanned track.

This device is particularly suitable for scanning tracks or furrows such as those arising when plowing. Here the wide range of cover of the device proves to be particularly advantageous. In case of a reversal of the direction of cultivation, the laser scanning device does not have to be pivoted mechanically. Only the regulating signal has to be provided with an altered offset and fed to the automatic steering device. For this purpose for example sensors present on a plow can determine the position of the plow frame and convey it to the analyzer or steering regulator device. The offset can further be influenced manually or by an inclined position measuring means of the agricultural machinery.

In another embodiment the laser scanning device allows a subsequent cultivation track only in the preselected identical direction of cultivation (e.g. general-purpose plow, cutter bars), can be mounted directly over the lane or cultivation edge on the cultivation implement or agricultural machine or harvesting machine. Conversion of the measured track position or addition of an offset can then be eliminated.

On the basis of the laser scanning device, precautionary methods can be implemented for operation of the agricultural machinery. If a preset threshold value for the increase in height and/or the absolute height of a scanned contour in the direction of travel is exceeded, a caution signal is generated for the operator. Hence the driver is given notice of undulations of the ground or obstacles which could lead to implement damage.

Obstacles (e.g. poles for overhead power lines, trees, rocks, etc.) which, owing to their vertical extent, do not lie within a permitted range of contour expectation values can be detected on the field by means of the laser scanning device.

BRIEF DESCRIPTION OF THE DRAWINGS

Reference is made to the drawings which illustrate the best known mode of carrying out the invention and wherein.

DETAILED DESCRIPTION

Figure 1:
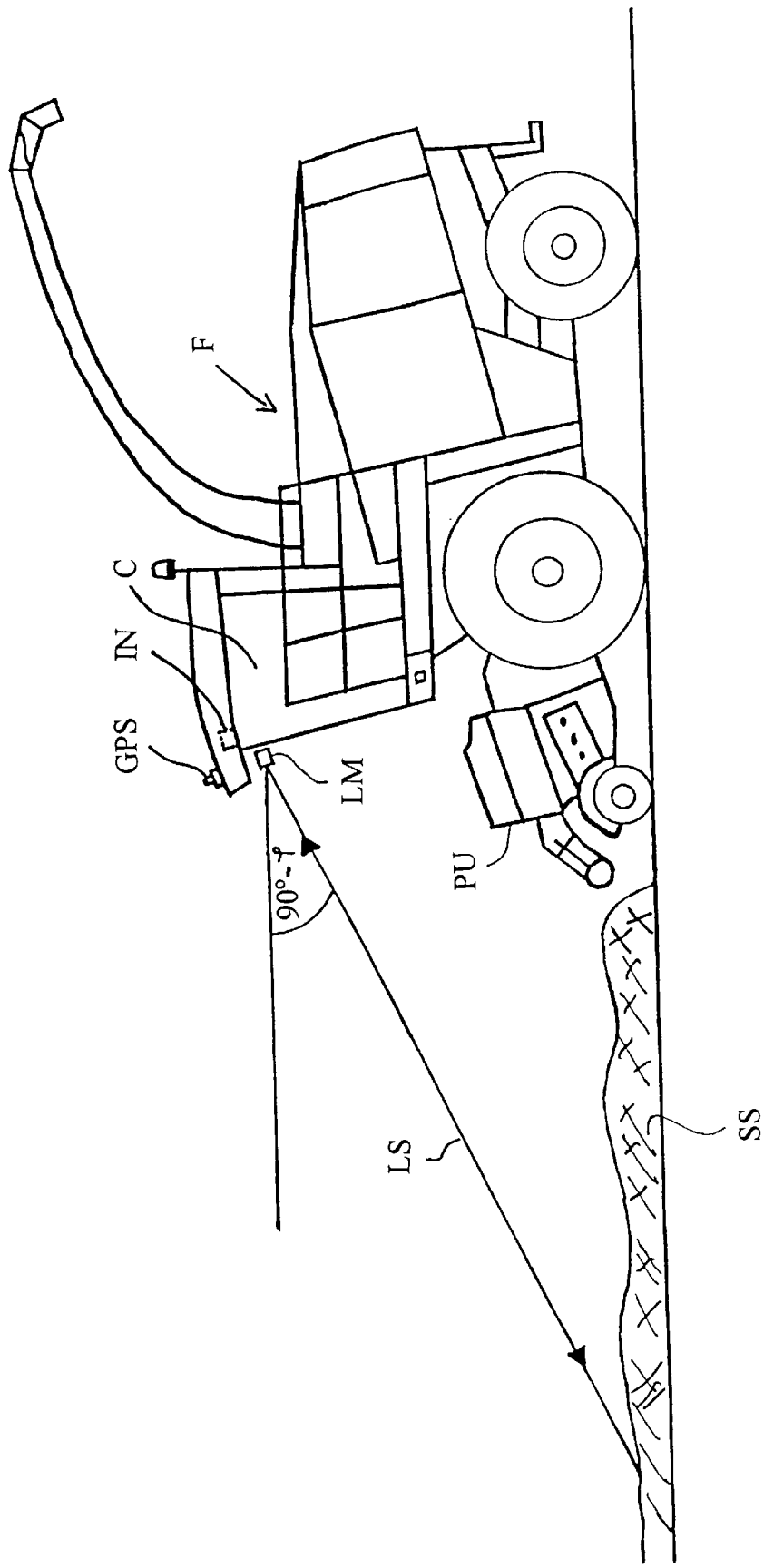
FIG. 1 is a side view of a forager with a laser scanning device.

FIG. 1 shows an agricultural machine, i.e. a forager F, with a pick-up attachment PU picking up crop material located in a swath S. A laser distance measuring device LM is mounted at the top of the driver's cab C, i.e. a height of approximately 3.80 meters, and inclined at an angle of about 65° to the ground. This setting of the laser distance measuring device LM provides a scanning distance of approximately 8.15 meters in front of the laser distance measuring device LM. The location of mounting on the agricultural machinery is in each case predetermined as a function of the structural peculiarities of the agricultural machinery and the specific purposes of use and should be selected as high as possible for optimum contour detection. To achieve high flexibility of adjustment, the laser distance measuring device LM is preferably mounted with adjustable height and inclination on the agricultural machinery.

Figure 2:
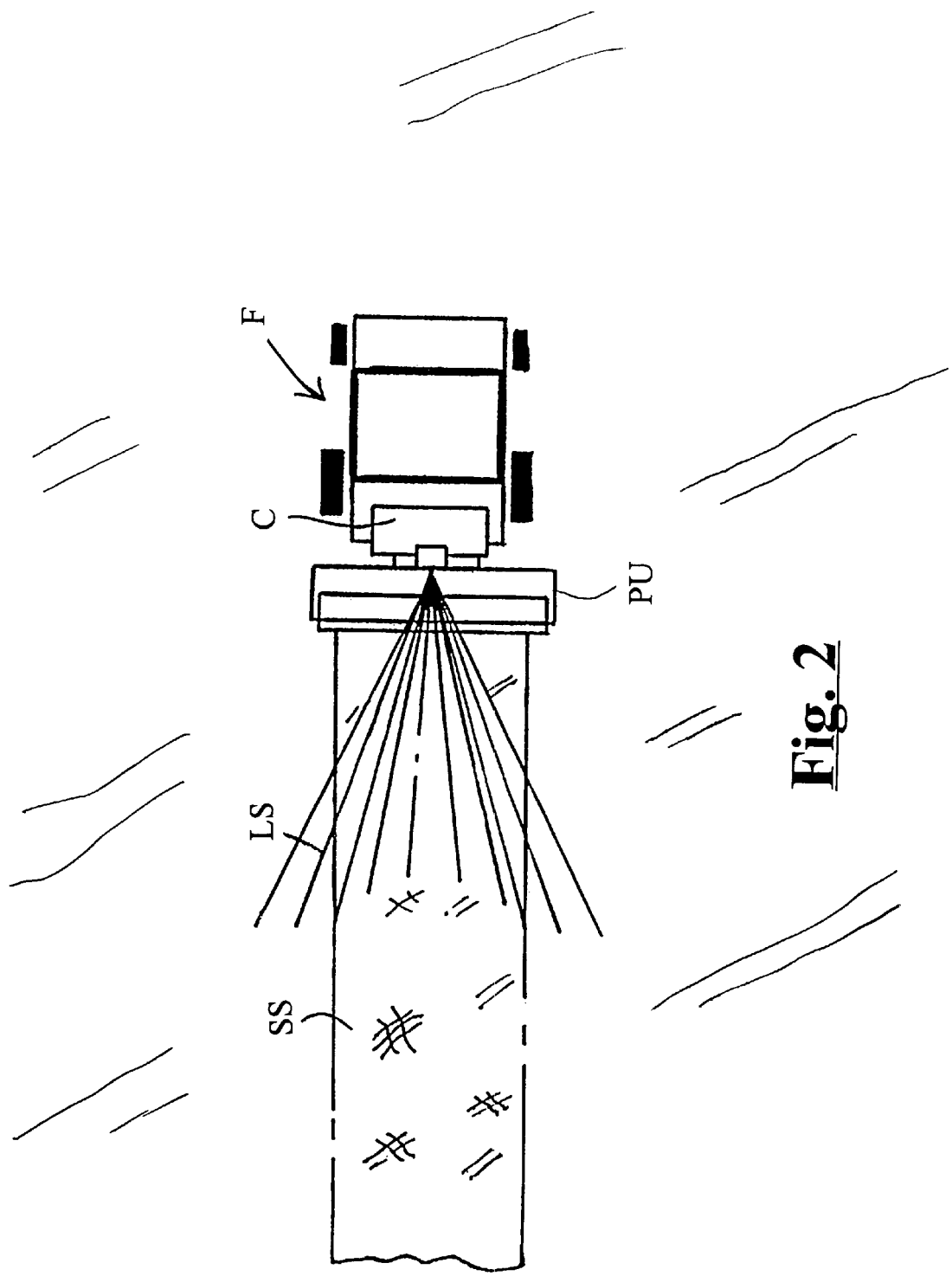
FIG. 2 is a top view of the FIG. 1 machine and the laser scanning device in use for swath scanning.

For a better understanding, FIG. 2 is a top view of the forager F with the pick-up attachment PU in front of the swath SS to be picked up. The laser distance measuring device LM is located at the longitudinal center of the machine F measuring from right to left at the front of the machine and scans the swath SS contour symmetrically on both sides of the longitudinal direction of the agricultural machinery.

Figure 3:
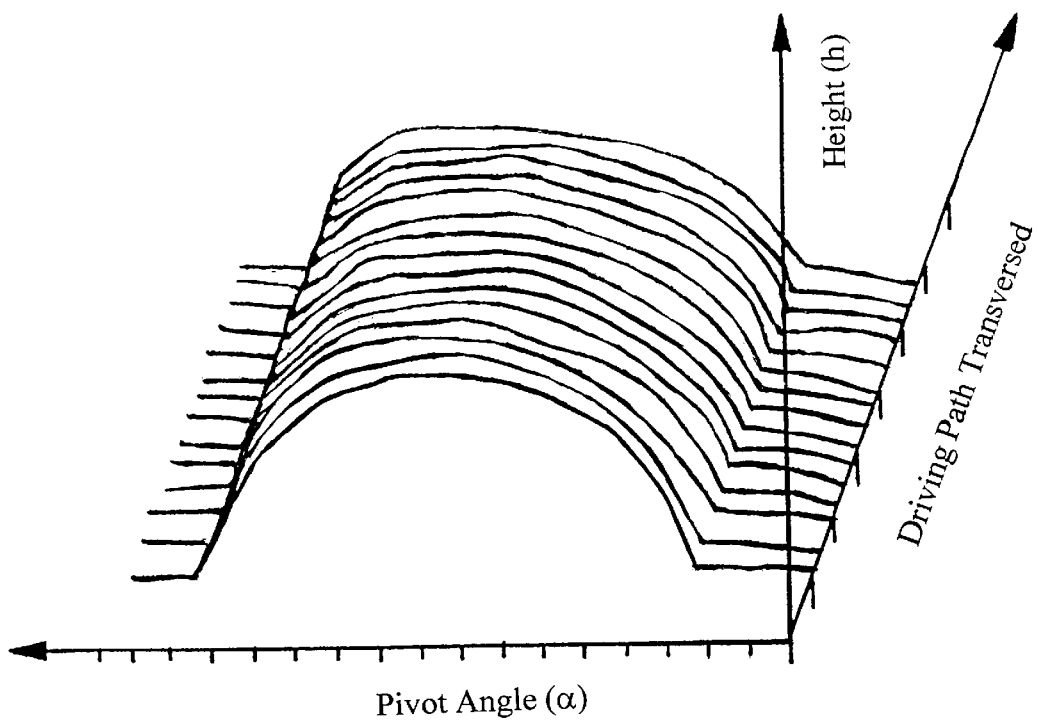
FIG. 3 is a three-dimensional view of a swath contour scanned with the device the driving path.

FIG. 3 charts the Pivot Angle a of the laser distance measuring device LM, the Driving Path Traversed, and the Height h. It shows a schematic three-dimensional view of the swath SS contour scanned by the laser distance measuring device LM along the driving path traversed by the agricultural machine F. The distances between the contour lines in the direction of travel results from the scanning frequency or pivot time for the laser scanning beam LS, and the travel speed of the agricultural machine F.

Figure 4:
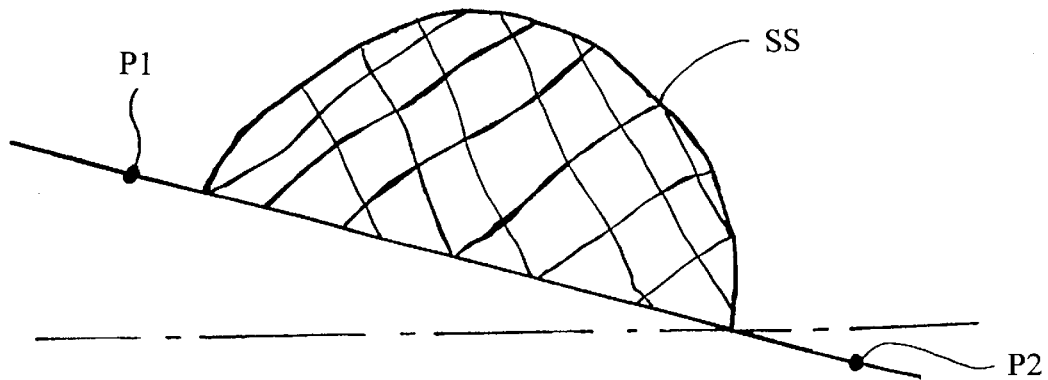
FIG. 4 is a cross-sectional view of a scanned swath over inclined ground.

FIG. 4 shows a scanned swath SS contour over an inclined ground base line P1-P2. Allowing for the true inclined path of the ground base line resulting from interpolation of the ground contours on the left and right sides of the swath S, more precise calculation of the swath cross-section relative to the horizontal can be carried out.

Figure 5:
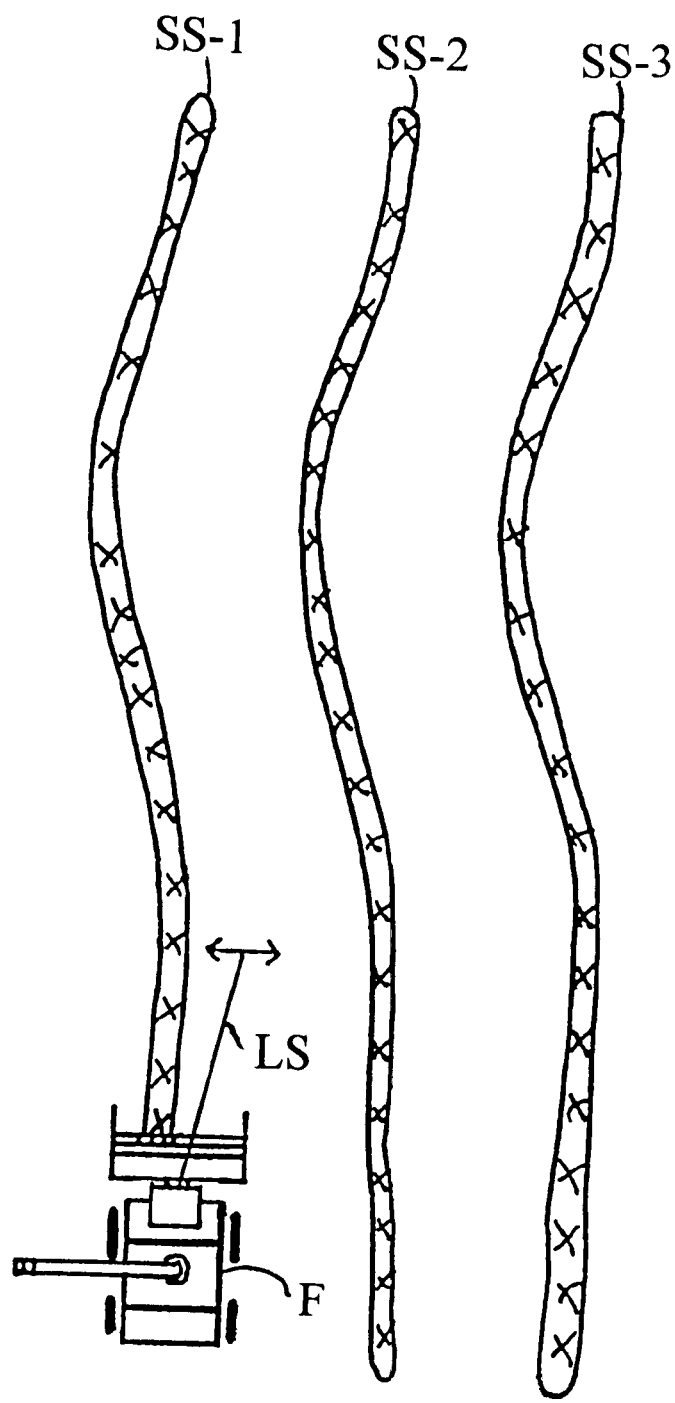
FIG. 5 is a top view of different swaths in a meadow.

FIG. 5 shows a top view of a forager F picking up swath SS-1 and the laser scanning beam LS performing its function. Adjacent swaths (e.g. SS-2, SS-3) of the crop material may be of differing sizes.

Figure 6:
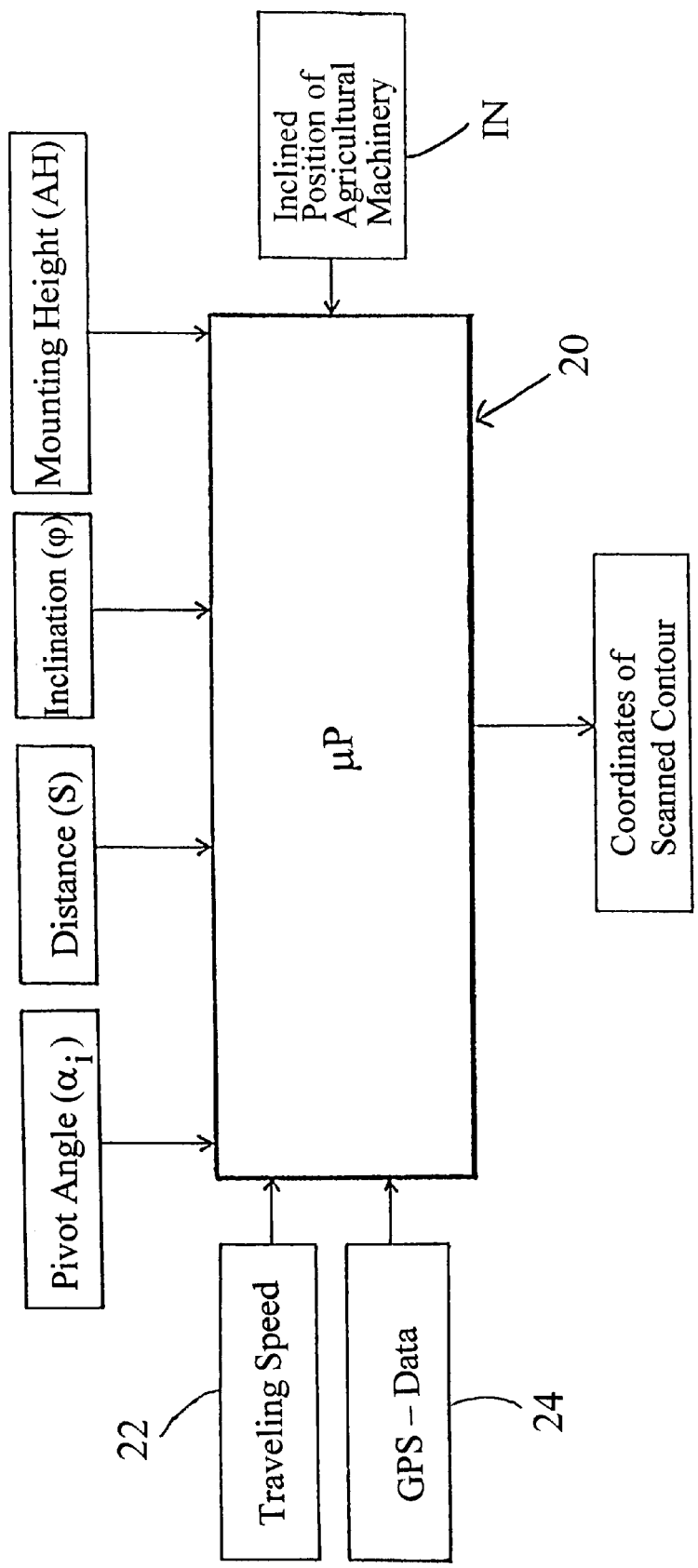
FIG. 6 is a block diagram of an analyzer with its input signals.

FIG. 6 is a block diagram of a microprocessor or analyzer 20 for calculating the scanned contour coordinates. The analyzer 20 receives input signals for the measured distance S from the contour point scanned at any given time, the pivot angle α at which each respective contour point is scanned, as well as the angle of inclination φ of the scanning beam plane to the vertical, and the height AH of mounting of the laser distance measuring device LM. From these data the analyzer 20 then calculates the contour coordinates. In advantageous embodiments the analyzer 20 receives further input signals such as the traveling speed from a speed sensor 22, GPS data from a position sensor 24, or information from an inclination sensor IN on the inclined position of the agricultural machine F. The analyzer 20 can be integrated in the laser distance measuring device LM or can be designed as one or more separate components. Preferably the analyzer 20 is connected to the agricultural machine's central control or vehicle bus system.

For a better understanding, FIGS. 7 through 10 show the geometrical ratios of laser beam scanning. The following meanings apply here:

AH: the height above the ground of the laser distance measuring device's mounting;

φ: the angle of inclination of the scanning beam plane to the vertical plane;

h: the height above the ground of the scanned contour point;

PE: the projected distance between the laser distance measuring device and the scanned contour point;

S: the measured distance between the laser distance measuring device and a scanned node;

$\alpha_i$: the ith pivot angle of the laser scanning beam in the scanning beam plane;

$S_0$: the measured distance for the center point beam; and $S_i$: the measured distance for the laser scanning beam pivoted through $\alpha_i$.

Figure 7:
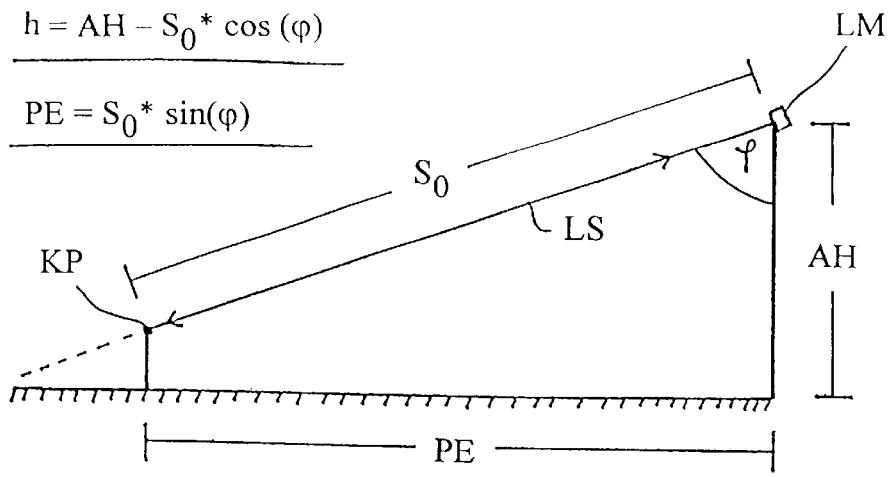
FIG. 7 to FIG. 10 are views showing the geometrical ratios of laser scanning.

In FIG. 7 are shown the geometrical ratios for the center point beam ($\alpha=0$). The height h of the scanned contour point KP is determined from the measured distance So, the height of the laser distance measuring device's mounting AH and the angle of inclination $\phi$ as:

$$h = AH - S_0 \times \cos(\phi).$$

The distance PE from the scanned contour point KP projected onto the ground is determined as:

$$PE = S_0 \times \sin(\phi).$$

Figure 8:
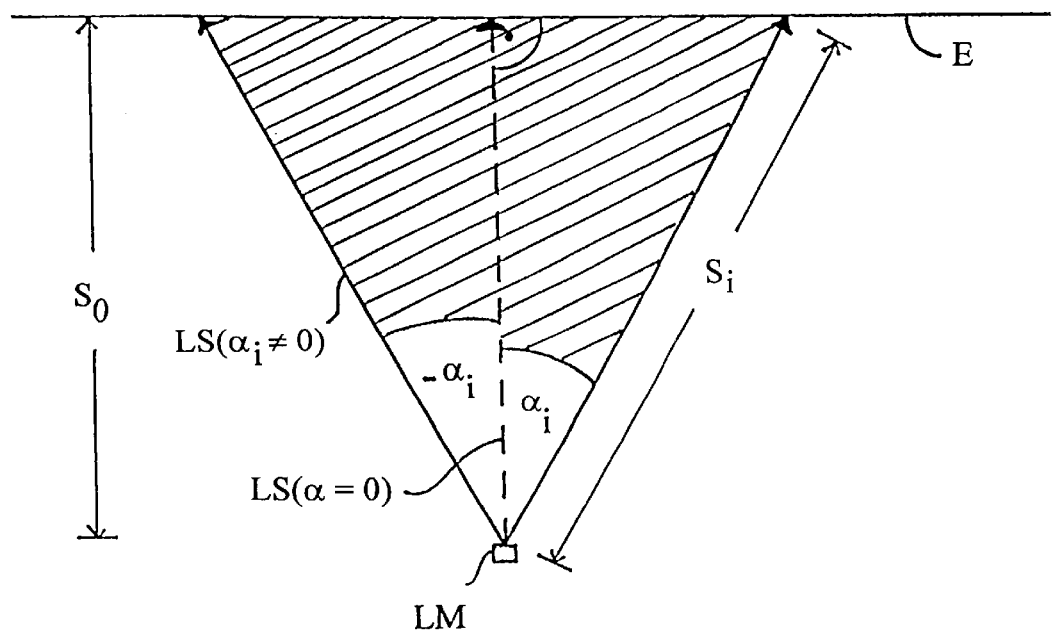

FIG. 8 shows a top view of a contour path E. This path contains no changes of contour. The distance S here represents the distance from the laser distance measuring device LM, in the direction of travel on flat terrain, to the ground. In order to obtain measured values for a contour E located orthogonally to the direction of travel at a distance So, where the center point beam is measured directly to the ground, the measured distance values LS($\alpha$ . . . 0) pivoted out of the center position is converted. The conversion formula for this is:

$$S_{\phi i} = S_i \times \cos(\phi_i).$$

Figure 9:
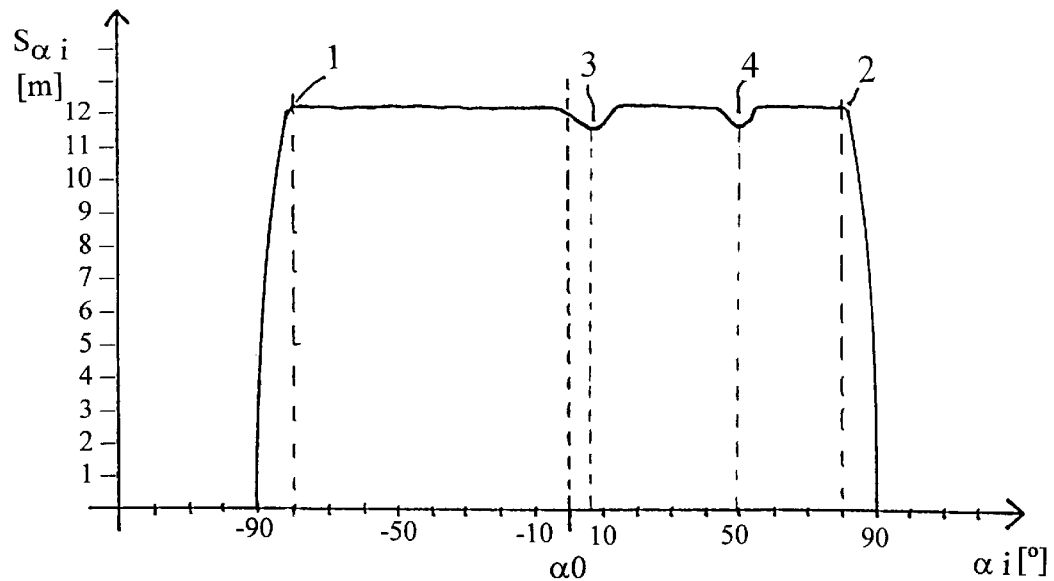

FIG. 9 shows a graph with displayed distance values which have been corrected as in FIG. 8. The scanning beam LS used here has a range of approximately 50 m. At either point 1 or 2 the maximum scanning width is exceeded and the beam is no longer reflected. Measured values outside this pivot range are therefore invalid. A cosine path is calculated at points 1 and 2. At points 3 and 4 a more compact scanning width of the scanning beam was determined. At these points there are projections in the contour. They show in each case the position and the cross-section of a swath. The swath at point 3 lies slightly off center on the side towards the direction of travel of the harvesting machine. The swath center can be determined and, referred to the center point beam, used for automatic steering of agricultural machinery. At point 4 is shown another swath. By means of the angular positions of the two swath centers determined at any given time, the distance between the swaths can be determined and, in addition to the swath length, the swath cross-sectional area and the swath density, can be fed to a harvesting area determining means or yield mapping means. For a better calculation of the cross-sectional the ground inclination on the right and left sides from the swath can be use to determine the ground base line under the swath by a result of an interpolation of both side contours. According with this scanned cross-sectional area, the traveling speed can be adjusted. The volume of the picked-up crop material can also be determined in conjunction with the measured swath distance traversed. If more crop material information is available, such as the crop density, the swath volume can be calculated into a yield data signal. These can also be recorded for further use. With the laser scanner, it is possible to detect the distance between adjacent swaths. This space information allows one to determine the area of the swath (See, FIG. 9). One better solution is to use a GPS-Navigation system mounted on the harvester cab (See, FIG. 1, GPS) in connection with the yield over the whole area by storing the yield of the picked-up swath in connection with the GPS-position to create a yield map.

Figure 10:
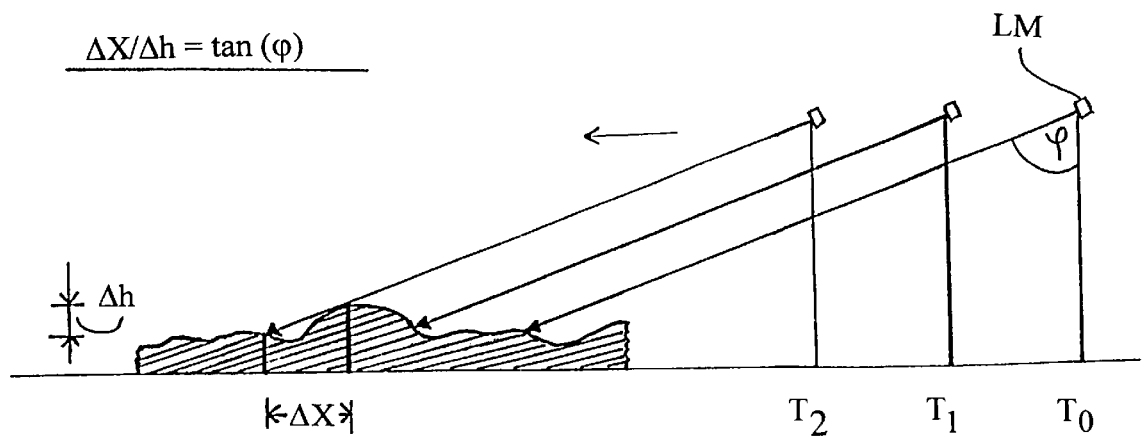

In FIG. 10 is shown a longitudinal section through a swath segment. Three successive measuring points are shown. In this case the associated pivot angle $\phi$ is not taken into consideration. Shading of the laser scanning beam LS occurs as a result of the differences in height in the swath. The maximum variation in contour height $\Delta h$, which can still be scanned within a certain distance $\Delta X$ between the scanned contour points in the direction of travel, is described by:

$$\Delta h = \Delta X / \tan \phi$$

If for example a scanning distance of $\Delta X = 11.1$ cm is predetermined by a traveling speed of v=10 km/h and a pivot angle frequency of 25 Hz (scanning frequency), at an angle of inclination of $\phi=65°$, the result is a maximum scannable difference height of $\Delta h=5.2$ cm. Such a value is sufficient for the applications of the method.

The steps of the method of contour scanning include providing the laser beam transmitting and receiving device LM; continually scanning the laser beam LS across the contour of the field in front of the agricultural machine F; measuring the distance values from the laser beam LS; and determining the contour of the field across the scanning width. Advantageously the contour information is stored. Other advantageous steps include, either alone or in combination, determining a track to be followed by the agricultural machine F from the contour and from the sum of successive contours; utilizing said determined track for automatic steering of the agricultural machine F along the track; and generating a signal for the automatic steering and adapting the signal by a manually controlled offset in such a way that a parallel shift between the measured track and the center point beam is accomplished. In one aspect the method includes the step of calculating the center of said track and using the same for further calculations. In some preferred uses the method is used to measure a swath, and includes determining, at any given time, the cross-section of the detected swath of crop material above the ground base line.

Figure 11:
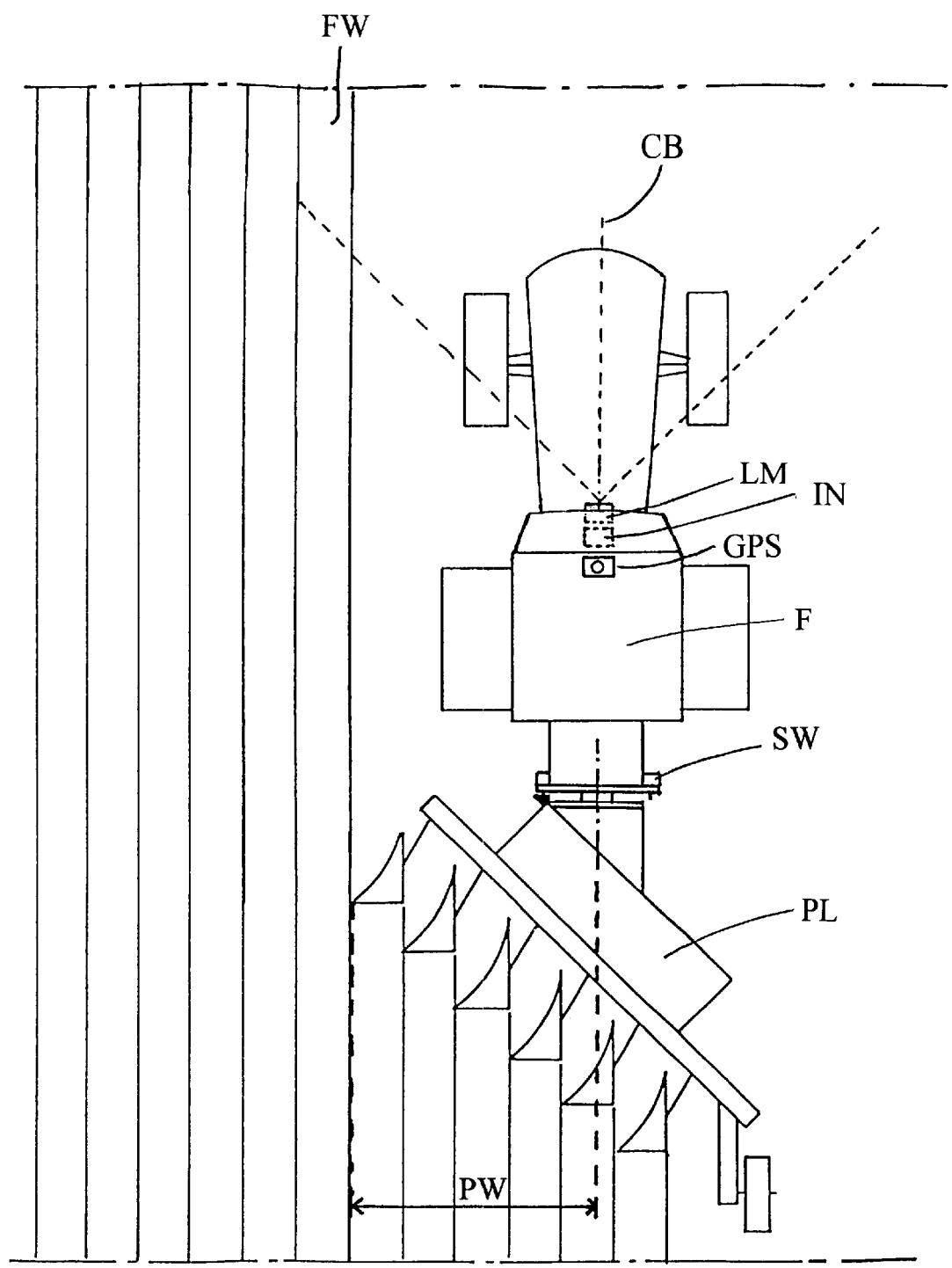
FIG. 11 is a top view of a farm tractor towing an implement, i.e. plow, along a furrow.

FIG. 11 shows how one may use the laser rangefinder on the top of an agricultural machine's cab for detecting a track or a furrow FW forward in the travel direction of the agricultural machine F which in this instance is a farm tractor. The furrow or track can be detected in a full scanned contour by a jump in the measured range. The agricultural machine F will be automatically steered along the scanned track or furrow FW. A further new feature is the offset control device by means like a switch SW on the plow PL, which detect in which direction the plow is used. In FIG. 11 the furrow is on the left side to the agricultural machine F in travel direction. The offset like the transversal distance between the center beam CB in travel direction and the actual furrow FW is given by a part of the working-width PW of the plow left from the longitudinal axis of the agricultural machine F. Another new feature is present in the automatically altering offset in connection with one or two switches on the plow PL.

Figure 12:
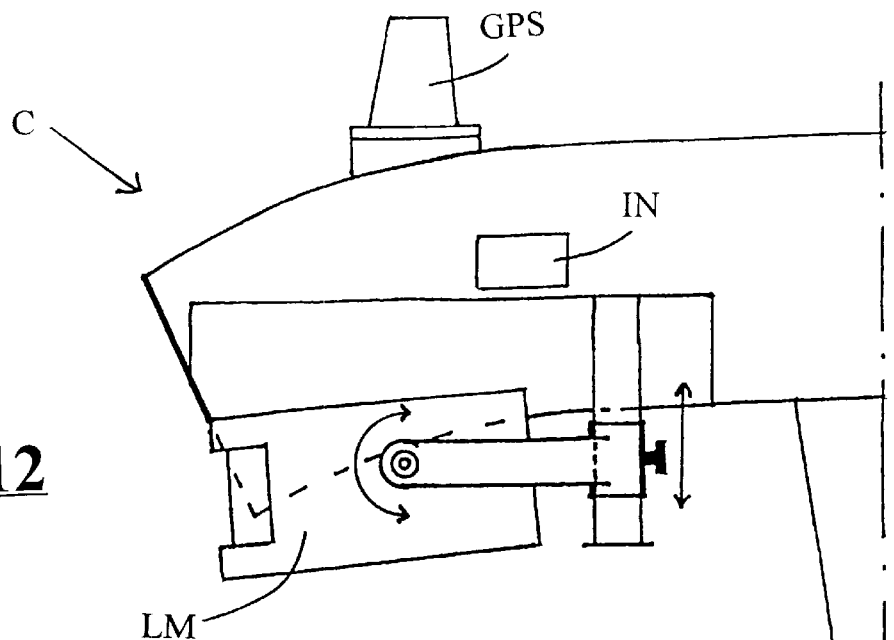
FIG. 12 is side view of a portion of an agricultural machine's cab with a mounted laser scanning device.

FIG. 12 shows an inclination sensor IN in connection with the detecting device. This inclination sensor IN is also shown used on a combine in FIGS. 15 and 16. If the agricultural machine is working along a hill, the travel direction and the longitudinal axis of the machine are not in the same direction. So, the center beam CB, based for all further calculations, is not reflected from a point of the longitudinal axis of the agricultural machine and the calculation for the steering signal (crop boundary, swath), the cutting width (cutting load) or the offset (plowing) is not correct. With an inclination sensor IN this problem can be overcome in two ways. First, an inclination offset can be added to the calculation in according the inclination of the agricultural machine along a hill. Second, the whole device can be pivoted mechanically so that there is no deviation between the center beam direction and the travel direction of the machine.

Figure 13:
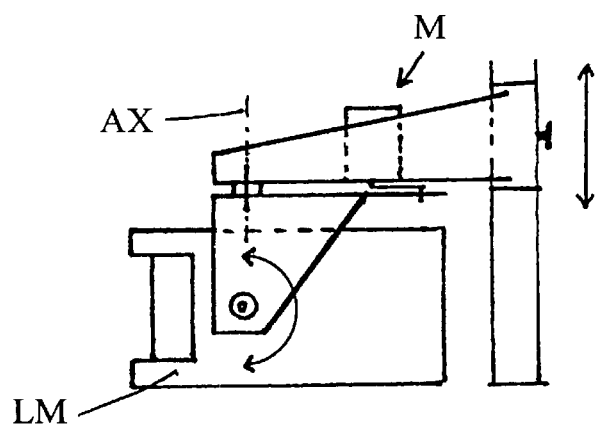
FIG. 13 is a side view of the mounted laser scanning device.
Figure 14:
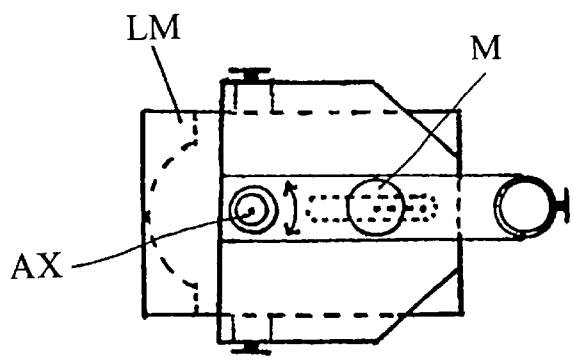
FIG. 14 is a top view of the mounted laser scanning device with an automatic adjusting device.

FIG. 12 shows a top of an agricultural machine's cab C with a mounted laser scanning device LM. On the top of the cab C there is also mounted a GPS-antenna GPS. Into the top of the driver's cab is one inclination sensor IN. In the middle of the roof in the cab, in front of the windshield, is a hole. In this hole the laser scanning device LM is fixed. The device LM can be adjusted by hands in the height and also the acute angle of the laser scanning device LM to the ground. FIGS. 13 and 14 show a same device LM as the figure on top of this side, but with an automatic adjusting device M which pivots the device around the axle AX. This device M can be use in connection with the inclination sensor IN or for pivoting the whole device with a fixed laser beam for scanning over a full contour or for both.

Features have been described in connection with a laser distance measuring device mounted at the roof of the agricultural machine cab C. This is only the preferred embodiment for the described applications. The laser distance measuring device may also be mounted on a lower position in front of or behind the windshield. It may also be spaced transversal from the longitudinal axis of the agricultural machine.

Figure 15:
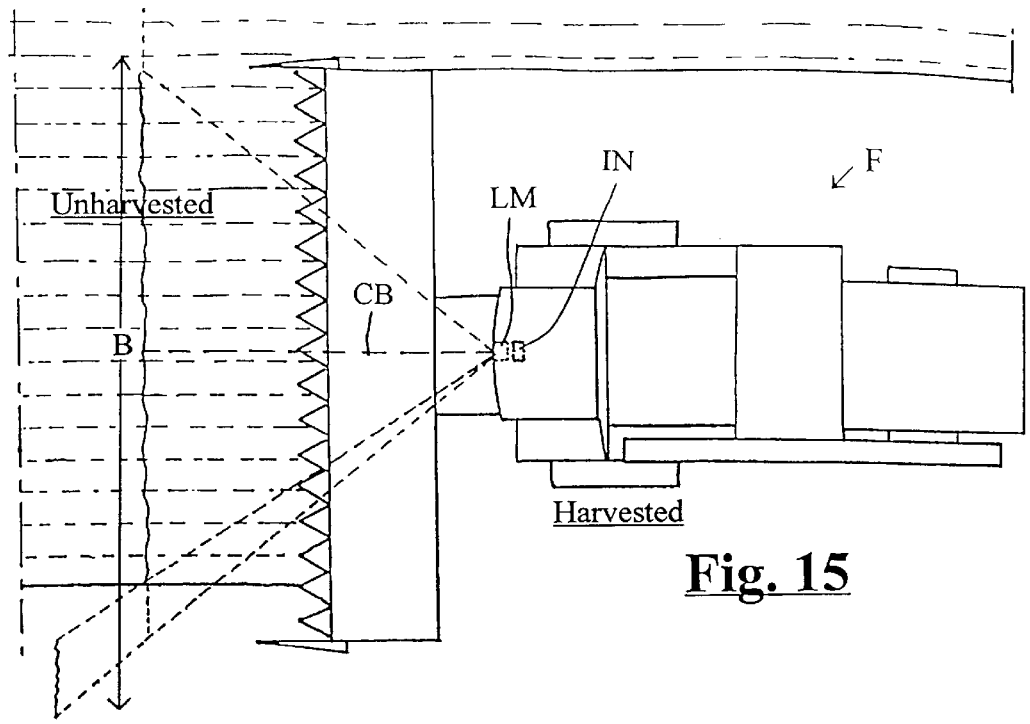
FIG. 15 is a top view of a combine with a laser scanning device in use for harvesting crops.
Figure 16:
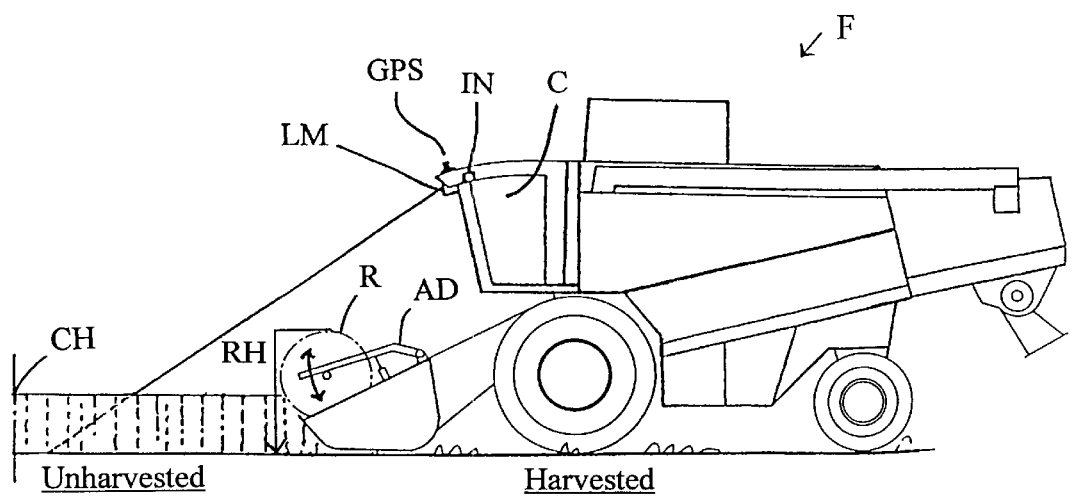
FIG. 16 is a side view of the combine with a laser scanning device

Referring now to FIGS. 15 and 16, the crop height can be calculated by the known parameters of the mounting position of the apparatus between the mounting height and the angle forward to the ground. For a full automatic height adjusting device, the calculated height of the standing crop CH can be different over a full scan, so it would be better to calculate a mean value over a full scan for the adjusted reel height RH of the reel R. If a predetermined quantity of the crop over a full scan is laying down on the ground the reel height RH will go down to the laying crop. With the new adjusting device AD, the reel height RH of the reel R can adjust automatically independent to the cutting height CH.

Another feature of the laser distance measuring device is to determine the actual load on the cutting mechanism as shown in FIG. 15. It is new to determine the load or the used cutting width. This feature can be used for an accurate harvested area calculation. In accordance with this the predefined boundaries of the cutting mechanism can be determined by the center reflection beam point CB on the surface of the crop and a transversal distance to this point by a half of the known cutting width to each side for the entire crop boundary B. The calculation for the cutting load can be Other objects, features, and advantages will be apparent to those skilled in the art. While preferred embodiments of the present invention and steps of the method have been illustrated and described, this has been by way of illustration and the invention should not be limited except as required by the scope of the appended claims.

We claim:

1. In an agricultural machine, an apparatus for contactless scanning of contours extending over ground; the improvement comprising:

a laser distance measuring device including a laser beam transmitting and receiving device which determines the distance from at least one contour point by measuring a running time of a laser scanning beam emitted and reflected at the at least one contour point;

the laser scanning beam being pivotal by a pivoting mechanism within an acute angular range stepwise in a scanning beam plane;

the laser distance measuring device being mounted on the agricultural machine such that the scanning beam plane is inclined to the ground at an acute angle forward in a direction of travel; and a processor operatively connected to the laser measuring device for receiving input for a measured distance, input for an arrangement and orientation of the laser distance measuring device, including a mounting height and angle of inclination to the ground, and the processor being operative for determining a position of the at least one contour point as an output.

2. The apparatus according to claim 1, wherein the laser distance measuring device is adjustably mounted for height on the agricultural machine by an adjusting mechanism.

3. The apparatus according to claim 1, including an inclination sensor on the agricultural machine for determining inclined positions of the agricultural machinery and sending a signal to the processor for use in determining the at least one contour point.

4. The apparatus according to claim 1, wherein the laser distance measuring device is pivotably mounted with an adjusting device and forms an acute angle with the ground.

5. The apparatus according to claim 1, wherein the laser distance measuring device is attached to an adjusting device that allows the laser distance measuring device to pivot around an axle.

6. The apparatus according to claim 3, further including an automatic adjusting device attached to the laser distance measuring device for pivoting the laser distance measuring device in response to an input signal from the inclination sensor.

7. The apparatus according to claim 1, wherein the at least one contour point includes a series of contour points, wherein the processor can determine a mean value for the series of the contour points and the apparatus includes a mechanism for adjusting a height of a reel operatively connected to the processor in response to the mean value for the series of contour points.

8. The apparatus according to claim 1, farther including a harvesting mechanism and wherein the at least one contour point includes a center beam reflection point wherein the laser scanning beam utilizes a scanning angle based on a transversal distance to the center reflection beam point by dividing the predetermined width on each side of the center reflection beam point to determine a contour with the processor and then calculate a load on the harvesting mechanism based on the determined contour.

9. A method of contour scanning during travel of an agricultural machine on ground including the steps of:

determining a distance from at least one contour point by measuring a running time of a laser scanning beam emitted and reflected at the at least one contour point with a laser beam measuring device that includes a laser beam transmitting and receiving device mounted on the agricultural machine such that the scanning beam plane is inclined to the ground at an acute angle forward in a direction of travel;

pivoting the laser scanning beam by a pivoting mechanism within an acute angular range stepwise in a scanning beam plane; and receiving input for a measured distance including an arrangement and orientation of the laser distance measuring device, including a mounting height and angle of inclination to the ground, and determining the at least one contour point as an output with a processor that is operatively connected to the laser beam measuring device.

10. The method according to claim 9, including a step of determining a track to be followed by the agricultural machine with the processor from the at least one contour point.

11. The method according to claim 10, including the step of utilizing the determined track for automatic steering of the agricultural machine along the determined track with an automatic steering device.

12. The method according to claim 10, including the step of calculating a center of the determined track and using the center of the determined track for further calculations by the processor.

13. The method according to claim 11, including the step of generating a signal for the automatic steering device and adapting the signal by a manually controlled offset in such a way that a parallel shift between the determined track and a center point beam of the reflected laser scanning beam is accomplished by an offset control device.

14. The method according to claim 13, wherein the step of adapting the signal includes determining an inclined position of the agricultural machine and adapting the signal, which is dependent upon the determined inclined position by an offset from an offset control device.

15. The method according to claim 13, wherein the step of adapting the signal includes determining a working direction of the agricultural machine and adapting the signal, which is dependent upon the working direction by an offset from an offset control device.

16. The method according to claim 10, wherein the track is a furrow and the agricultural machine is steered along the furrow.

17. The method according to claim 10, wherein the track is a swath that is determined by scanning a cross-section of a swath of crop material above a ground base line with the laser distance measuring device.

18. The method according to claim 17, including the step of determining the path of the ground base line under the swath by: scanning a ground base line on either side of the swath of crop material, interpolating information gathered by scanning to determine the ground base line; and using the ground base line for determination of the cross-section of the swath of crop material above a ground base line.

19. A method according to claim 18, including the steps of determining a scanning frequency of a laser distance measuring device; sensing a traveling speed of the agricultural machine; and using the cross-section of the swath of crop material in conjunction with the scanning frequency and the traveling speed to determine a volume of the cross-section of the swath of crop material.

20. The method according to claim 19, including the steps of using a density of the cross-section of the swath of crop material and using the measured volume of the cross-section of the swath of crop material to calculate a quantity of yield of harvested crops with the processor.

21. The method according to claim 17, including the steps of measuring distances between the swaths that are adjacent and using the distances between the adjacent swaths to determine a harvesting area.

22. The method according to claim 20, including determining a quantity of yield of harvested crops and using the quantity of yield of harvested crops to adjust working parameters of the agricultural machine with the processor.

23. The method according to claim 20, wherein a quantity of yield of harvested crops is used to adjust a traveling speed of the agricultural machine with the processor.

24. The method according to claim 9, wherein over at least a portion of the field, the at least one contour point is assigned terrestrial coordinates by a position finding system located on the agricultural machinery and the terrestrial coordinates are stored for further use.

25. The method according to claim 24, wherein the position finding system is a global positioning system.

26. The method according to claim 9, further including detecting a direction in which a working device on the agricultural machine is used with an offset control device.

27. The method according to claim 26, further including automatically altering an offset using at least one additional offset control device on the working device.

28. The method according to claim 9, further including a step of calculating an inclination offset with the processor.

29. The method according to claim 28, further including a step of using an inclination sensor to provide input to the processor to calculate the inclination offset.

30. The method according to claim 26, further including a step of factoring an inclination offset when determining the at least one contour point with the processor.

31. The method according to claim 26, further including a step of pivoting the laser beam transmitting and receiving device with an adjusting device.

32. The method according to claim 9, including the steps of: scanning with the laser beam by a pivoting mechanism across a path of the agricultural machine; and detecting obstacles in the path of the agricultural machine.

33. The method according to claim 9, including correcting the distance values with the processor during a pivot time of the laser scanning beam by a section of the ground traversed in each case.

34. The method according to claim 9, further including the step of utilizing the at least one contour point to regulate a height of a harvesting mechanism with a height adjusting device associated with the agricultural machine.

35. The method according to claim 9, further including the steps of: setting a threshold value for an increase in height of the at least one contour point in a direction of travel in front of the agricultural machine; and generating a signal if the threshold value is exceeded.

36. The method according to claim 9, further including the steps of: determining a mean height of a contour of the crops based the at least one contour point; and using the mean height of the contour of the crops to regulate a height of a reel associated with the agricultural machine.

37. The method according to claim 9, further including the steps of:

determining a center reflection beam point on a surface of crops;

determining a scanning beam angle based on a transversal distance to the center reflection beam point by dividing the predetermined width on each side of the center reflection beam point; and calculating a measurement for cutting load based on the determined at least one contour with the processor.

38. In an agricultural machine, an apparatus for contactless scanning of contours extending over the ground; the improvement comprising:

a laser distance measuring device including a laser beam transmitting and receiving device which determines the distance from at least one contour point by measuring a running time of a laser scanning beam emitted and reflected at the at least one contour point;

the laser scanning beam being pivotal by a pivoting mechanism within an acute angular range stepwise in a scanning beam plane;

the laser distance measuring device being mounted on the agricultural machine such that the scanning beam plane is inclined to the ground at an acute angle forward in a direction of travel; and a processor for receiving an input for a measured distance, input for the arrangement and orientation of the laser distance measuring device, including a mounting height and angle of inclination to the ground, and the processor being operative for determining a position of the at least one contour point as an output; and an inclination sensor mounted on the agricultural machine for determining inclined positions of the agricultural machinery and sending an input to the processor for use in determining the at least one contour point.

39. The apparatus according to claim 38, wherein the agricultural machine includes a cab and a roof on top of the cab and wherein the laser distance measuring device is mounted at the roof of the cab.

* * * * *